(12) United States Patent
de Jong et al.

(10) Patent No.: US 9,223,424 B2
(45) Date of Patent: Dec. 29, 2015

(54) ELECTRONIC DEVICE SIGNAL ROUTING STRUCTURES WITH CONDUCTIVE ADHESIVE

(71) Applicant: Apple Inc., Cupertino, CA (US)

(72) Inventors: Erik G. de Jong, San Francisco, CA (US); Anna-Katrina Shedletsky, Mountain View, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 13/858,746

(22) Filed: Apr. 8, 2013

(65) Prior Publication Data

US 2014/0300832 A1 Oct. 9, 2014

(51) Int. Cl.
*G06F 3/041* (2006.01)
*G02F 1/1345* (2006.01)
*G02F 1/1335* (2006.01)
*G02F 1/1333* (2006.01)

(52) U.S. Cl.
CPC ............ *G06F 3/041* (2013.01); *G02F 1/13452* (2013.01); *G02F 1/13338* (2013.01); *G02F 1/133308* (2013.01); *G02F 1/133608* (2013.01); *G06F 2203/04103* (2013.01)

(58) Field of Classification Search
CPC ............ G02F 1/13338; G02F 1/13452; G02F 1/133308; G02F 1/133608; G06F 3/041
USPC .......................................................... 349/12
See application file for complete search history.

(56) References Cited

U.S. PATENT DOCUMENTS

| 4,451,694 | A | 5/1984 | Harper et al. |
| 4,930,045 | A | 5/1990 | Carlson et al. |
| 6,771,327 | B2 * | 8/2004 | Sekiguchi ........................ 349/12 |
| 6,915,567 | B2 * | 7/2005 | Nakao et al. .................... 29/858 |
| 7,158,124 | B2 * | 1/2007 | Nakajima ..................... 345/173 |
| 8,259,089 | B2 | 9/2012 | Lee et al. |
| 2009/0314621 | A1 | 12/2009 | Hotelling |
| 2010/0295800 | A1 | 11/2010 | Kuo |
| 2010/0321326 | A1 | 12/2010 | Grunthaner et al. |
| 2011/0001706 | A1 | 1/2011 | Sanford et al. |
| 2013/0009894 | A1 | 1/2013 | Wang et al. |
| 2013/0057501 | A1 * | 3/2013 | Nagata et al. ................. 345/173 |

* cited by examiner

*Primary Examiner* — Paisley L Arendt

(74) *Attorney, Agent, or Firm* — Treyz Law Group, P.C.; G. Victor Treyz; Joseph F. Guihan

(57) ABSTRACT

An electronic device may have structures that are coupled together using conductive adhesive such as anisotropic conductive film and other adhesives. The structures that are coupled together may include a touch sensor structure formed from electrodes on the inner surface of a display cover layer, a display module having display layers such as a thin-film transistor layer, and circuitry mounted on substrates such as printed circuits. Conductive signal path structures may be used in routing signals within the electronic device. The conductive signal path structures may be formed from pins that are embedded within injection molded plastic, from metal traces such as laser-deposited metal traces that are formed on the surface of a plastic member or other dielectric, from metal structures that run within channels in a plastic, printed circuit traces, and other signal path structures.

22 Claims, 20 Drawing Sheets

ELECTRONIC DEVICE SIGNAL ROUTING STRUCTURES WITH CONDUCTIVE ADHESIVE

BACKGROUND

This relates to electronic devices and, more particularly, to structures for routing signals within electronic devices.

Electronic devices such as cellular telephones and other portable devices have electrical components. Printed circuits and cables are used to route signals between the components.

In some devices, a conductive adhesive such as anisotropic conductive film is used in forming electrical connections between routing lines. Anisotropic conductive film can be highly conductive when activated by application of heat and pressure, but generally does not exhibit the same mechanical properties as other types of adhesive. For example, the impact resistance of anisotropic conductive film may be less than that of other adhesives, limiting the use of anisotropic conductive films in applications where impact resistance is needed. This can make it difficult to form signal routing paths that include anisotropic conductive film. If care is not taken, structures will not be adequately attached to each other and mechanical and electrical connections may not be satisfactory. Signal path layouts can also be constrained by the signal line substrates that are available for forming signals paths.

It would therefore be desirable to be able to provide improved structures for attaching device components together and for forming signal routing paths for an electronic device.

SUMMARY

An electronic device may have structures that are coupled together using conductive adhesive such as anisotropic conductive film and other adhesives.

The structures that are coupled together may include a touch sensor structure formed from electrodes on the inner surface of a display cover layer, a display module having display layers such as a thin-film transistor layer, and circuitry mounted on substrates such as printed circuits.

Conductive signal path structures may be used in routing signals within the electronic device. The conductive signal path structures may be formed from pins that are embedded within injection molded plastic, from metal traces such as laser-deposited metal traces that are formed on the surface of a plastic member or other dielectric, from metal structures that run within channels in a plastic member, from printed circuit traces, and from other metal structures supported by a plastic member or other dielectric. The plastic member may have a shape with a first portion that runs horizontally and a second portion that runs vertically, may have the shape of a plastic display chassis, or may have other shapes. A metal member such as a bracket may have an opening into which metal structures are mounted using injection molded plastic. Anisotropic conductive film may be used in coupling the metal structures in conductive signal path structures such as these to components such as touch sensor structures, display structures, and other circuitry.

Further features, their nature and various advantages will be more apparent from the accompanying drawings and the following detailed description of the preferred embodiments.

DETAILED DESCRIPTION

Figure 1:
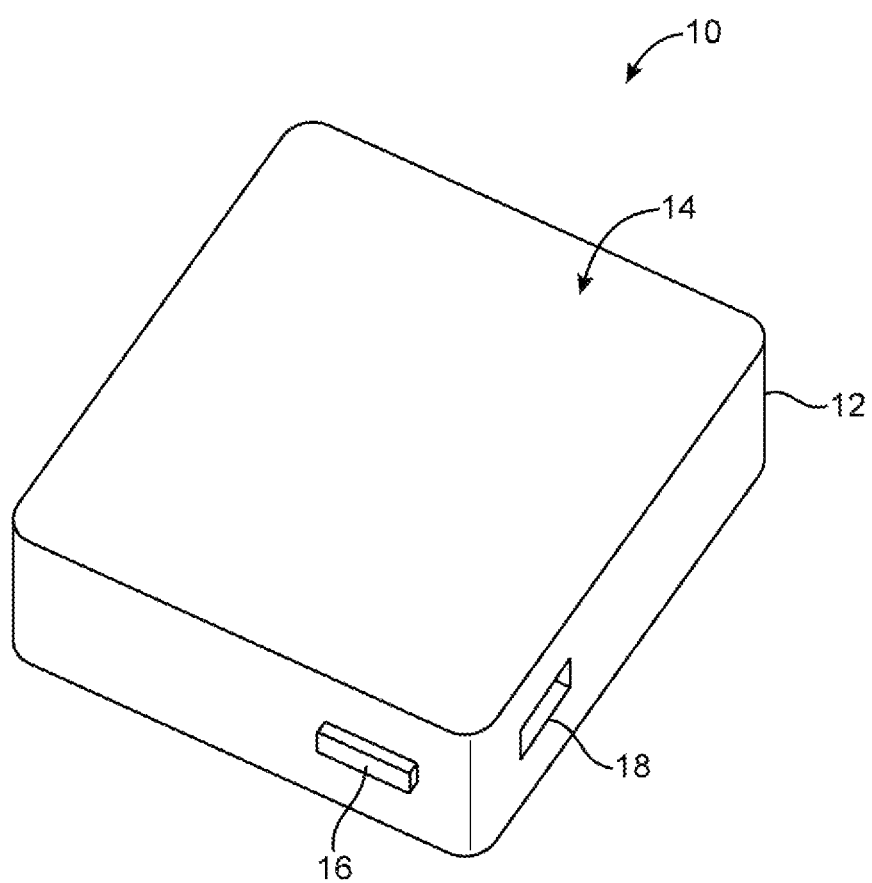
FIG. 1 is a front perspective view of an illustrative electronic device in accordance with an embodiment.

An illustrative electronic device of the type that may be provided with electronic components and signal paths for routing signals between the electronic components is shown in FIG. 1. Device 10 of FIG. 1 may be a handheld device such as a cellular telephone or media player, a tablet computer, a notebook computer, other portable computing equipment, a wearable or miniature device such as a wristwatch or pendant device, a television, a computer monitor, or other electronic equipment.

As shown in FIG. 1, electronic device 10 may include a display such as display 14. Display 14 may be a touch screen that incorporates a layer of conductive capacitive touch sensor electrodes or other touch sensor components or may be a display that is not touch-sensitive. Display 14 may include an array of display pixels formed from liquid crystal display (LCD) components, an array of electrophoretic display pixels, an array of electrowetting display pixels, an array of organic light-emitting diode pixels, or display pixels based on other display technologies.

Display 14 may be protected using a display cover layer such as a layer of transparent glass or clear plastic. Openings may be formed in the display cover layer. For example, an opening may be formed in the display cover layer to accommodate buttons, speaker ports, and other components. Configurations of the type shown in FIG. 1 in which display 14 is free of openings in the display cover layer may also be used, if desired.

Device 10 may have a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may, if desired, have openings such as an opening to accommodate one or more buttons such as button 16 and one or more openings to form port 18 (e.g., a connector port, a speaker port, a microphone port, etc.). If desired, housing 12 may be free or nearly free of openings (e.g., in configurations in which device 10 receives and transmits signals wirelessly).

Figure 2:
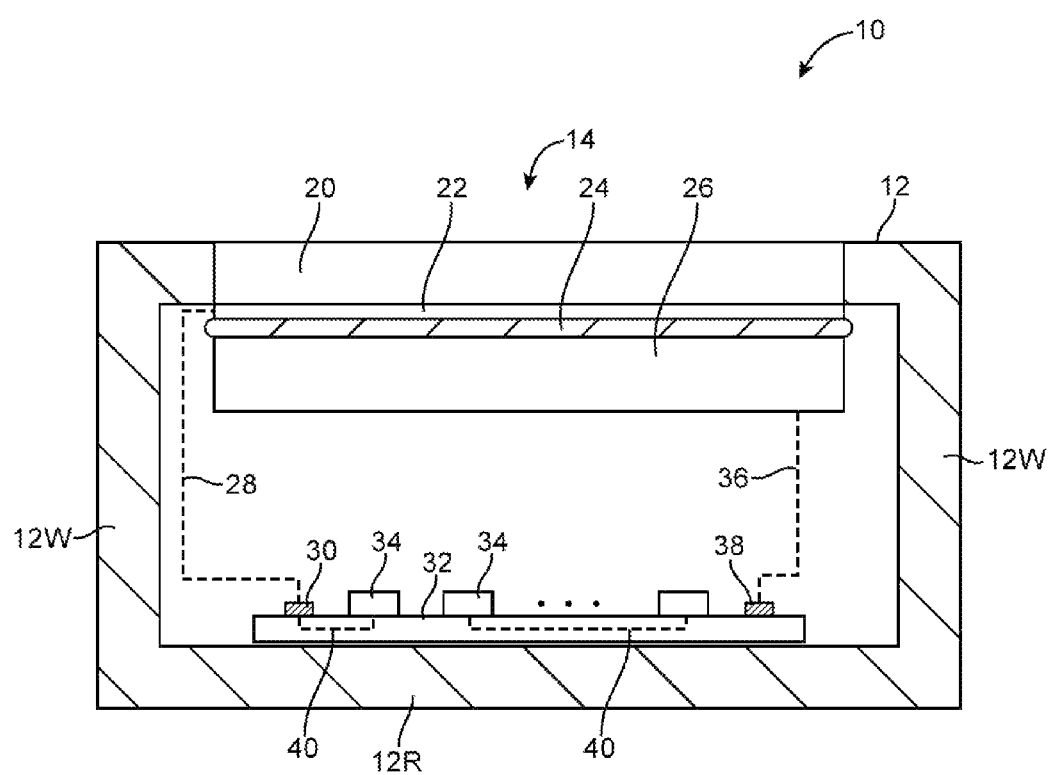
FIG. 2 is a cross-sectional side view of an illustrative electronic device in accordance with an embodiment.

A cross-sectional side view of an illustrative electronic device is shown in FIG. 2. As shown in FIG. 2, electronic device housing 12 may have side housing walls such as walls 12W and a planar rear wall such as wall 12R. Other shapes may be used for housing 12 if desired. The configuration of FIG. 2 is merely illustrative.

Display 14 may have a display module (sometimes referred to as display structures or display layers) such as display module 26. Display module 26 may contain an array of display pixels such as liquid crystal display pixels, organic light-emitting diode display pixels, electrophoretic display pixels, or display pixels formed using other technologies. Adhesive 24 may be used to attach display module 26 to the underside (inner surface) of display cover layer 20.

Display cover layer 20 may be formed from a clear layer of glass, a transparent plastic structure, or other transparent members. Display 14 may be a touch screen display that includes a touch sensor. The touch sensor may be formed from a touch sensor panel. The touch sensor panel may have array of capacitive touch sensor electrodes formed from a transparent conductive material such as indium tin oxide formed on a transparent polymer substrate layer. If desired, the touch sensor may be formed from an array of transparent conductive capacitive touch sensor electrodes such as touch sensor electrodes (touch sensor array) 22 of FIG. 2 that are formed directly on the underside of display cover layer 20 (i.e., between adhesive 24 and display cover layer 20).

Device 10 may include one or more substrates such as substrate 32. Substrates such as substrate 32 may include plastic carriers, printed circuit boards such as rigid printed circuit boards (e.g., boards formed from fiberglass-filled epoxy) and flexible printed circuits (e.g., printed circuits formed from flexible layers of polymer such as polyimide sheets with one or more layers of metal traces), or other dielectric substrate structures. One or more components such as components 34 may be mounted on the substrate structures. Components 34 may include integrated circuits, discrete components, batteries, display driver components, touch sensor processing circuits, switches, connectors, and other circuitry. As shown in FIG. 2, signal paths such as path 28 may be used to couple touch sensor layer 22 to the circuitry of components 34 on printed circuit 32. Path 28 may include one or more metal lines that are coupled to traces 40 in substrate 32 using a connector such as connector 30 or other coupling mechanism. Signal paths such as path 36 may be used to couple display module 26 to the circuitry of components 34 on printed circuit 32. Path 36 may include one or more metal lines that are coupled to traces 40 in substrate 32 using a connector such as connector 38 or other coupling mechanism.

Paths such a paths 28 and 36 and other signal paths in device 10 (e.g., the paths formed from printed circuit traces 40) may include one or more conductive signal lines. For example, these paths may contain numerous signal lines in parallel to form serial buses, parallel buses, and other signal paths that carry digital and/or analog signals. Path 28 may, for example, include multiple parallel metal lines for carrying touch sensor signals from touch sensor 22 to touch sensor processing circuitry on substrate 32. Path 36 may contain multiple parallel metal lines for carrying display signals from components on substrate 32 to display module 26.

Within the signal paths of device 10, it may be desirable to form connections between two different conductive parts. For example, it may be desirable to couple conductive traces on one substrate such as indium tin oxide touch sensor traces, metal traces on a display, or other conductive traces to conductive structures on another substrate such as metal traces on a printed circuit or metal members in a connector. Conductive coupling structures in device 10 may be formed from connectors, welds, solder, conductive adhesive, and other conductive structures. As an example, conductive adhesive such as anisotropic conductive film may be used in forming conductive coupling structures.

Figure 3A:
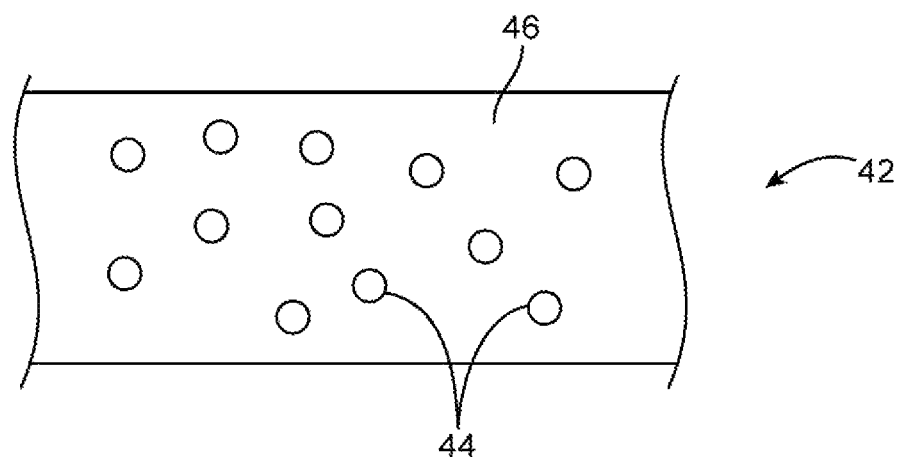
FIG. 3A is a cross-sectional side view of an uncompressed anisotropic film in accordance with an embodiment.
Figure 3B:
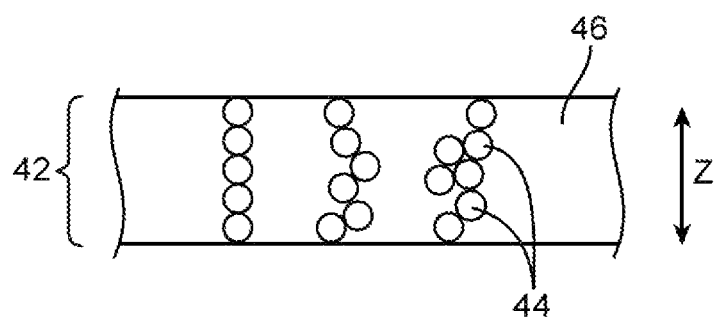
FIG. 3B is a cross-sectional side view of the anisotropic conductive film following compression to form a conductive path in accordance with an embodiment.

Anisotropic conductive film may contain a heat activated adhesive material such as epoxy and conductive particles such as metal balls. A cross-sectional side view of an illustrative film is shown in FIG. 3A. In the configuration of FIG. 3A, anisotropic conductive film 42 is in an uncompressed state, so conductive particles 44 (e.g., metal balls or other metal particles) are suspended in adhesive 46 (e.g., heat activated epoxy) and are isolated from each other. Following compression under heat and pressure, metal particles 44 are shorted together and form conductive paths through film 42 in vertical dimension Z, as shown in FIG. 3B.

Figure 4:
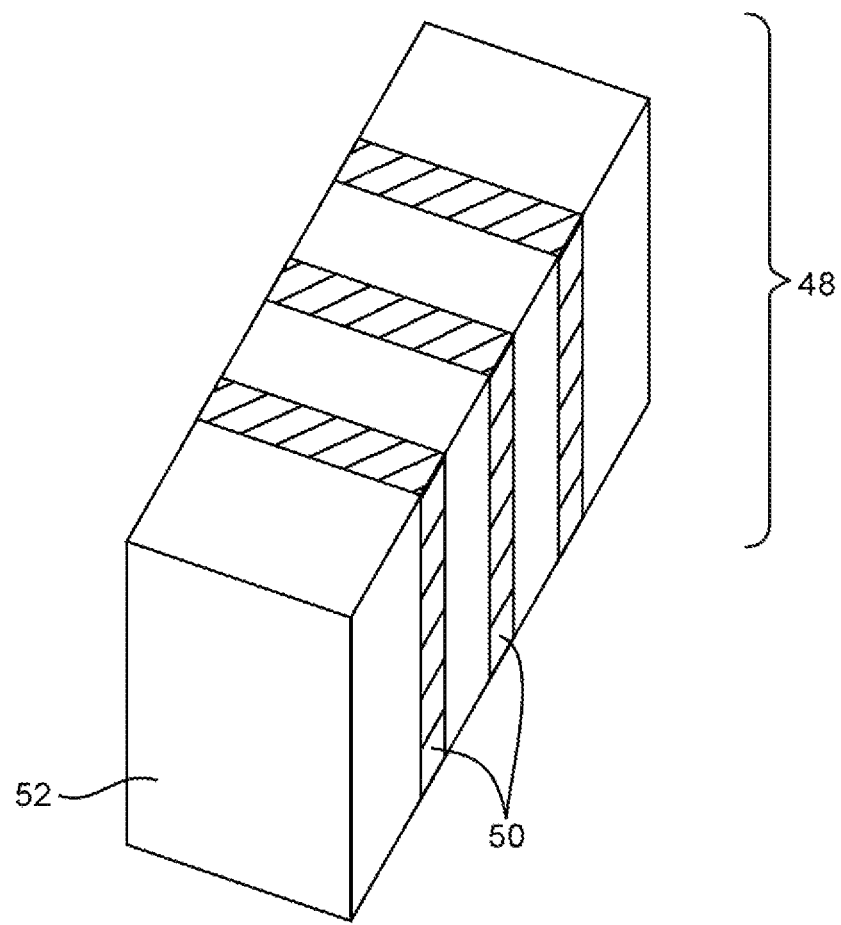
FIG. 4 is a perspective view of an illustrative structure with metal strips embedded in a dielectric carrier for forming electrical signal paths in an electronic device in accordance with an embodiment.
Figure 5:
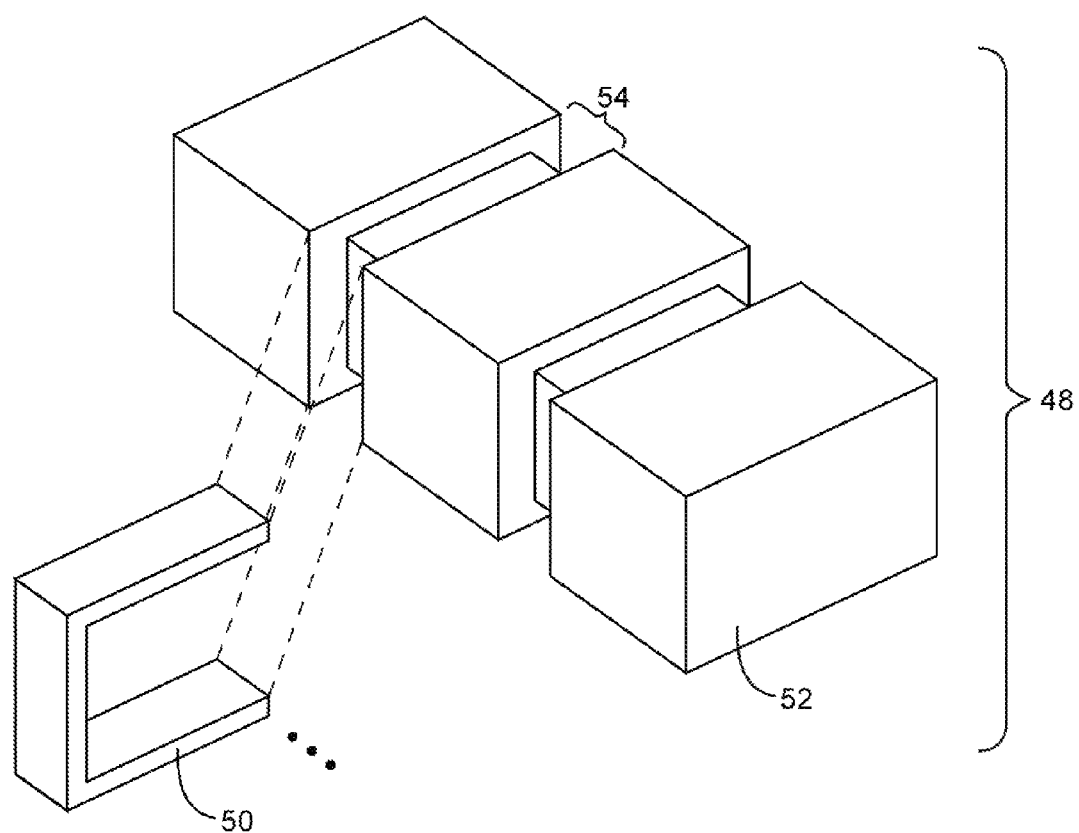
FIG. 5 is an exploded perspective view of an illustrative structure with metal clips attached to a dielectric carrier for forming electrical signal paths in an electronic device in accordance with an embodiment.

If desired, conductive signal paths in device 10 may be formed using metal members such as metal bars or other conductive structures that are supported by an injection molded plastic carrier or other dielectric carrier. This type of configuration is shown in FIG. 4. As shown in FIG. 4, conductive signal path structures 48 include metal members 50 that are supported by dielectric material 52. Metal members 50 may be metal bars, strips of metal, or other conductive structures. Dielectric support material 52 may be a rigid dielectric such as rigid injection-molded plastic. Metal members 50 of FIG. 4 may pass though then entire body of support structure 52 or may be wrapped around the exterior of support structure 52. In a typical configuration, each of metal members 50 is electrically isolated from the other metal members 50 in structure 48. Configurations in which two or more of metal members 50 are shorted together may also be used, if desired. In the illustrative configuration of FIG. 5, metal members 50 have been formed from C-shaped strips of metal that clamp onto the exterior of support structure 52 in respective grooves 54.

Figure 6:
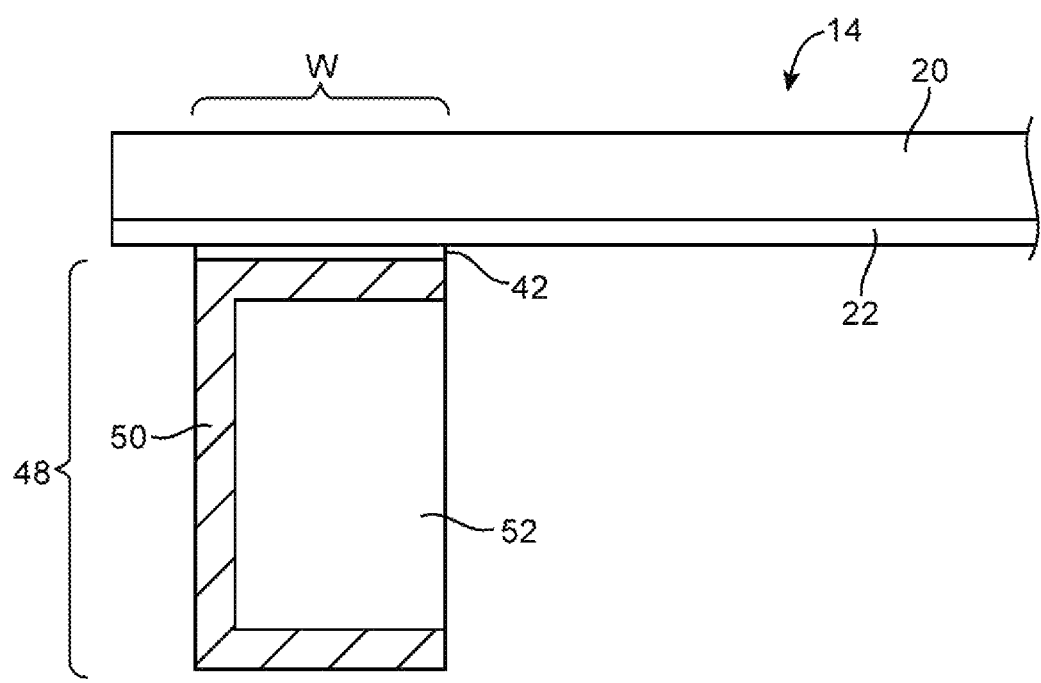
FIG. 6 is a cross-sectional side view of a portion of an electronic device in which a signal path has been formed using a metal clip structure of the type shown in FIG. 4 in accordance with an embodiment.

FIG. 6 is a cross-sectional side view of a portion of device 10 in which signal path structures such as structures 48 have been used in forming signal paths for display 14. In particular, a conductive adhesive such as anisotropic conductive film 42 has been interposed between the conductive traces of touch sensor layer 22 and conductive metal members 50 on dielectric support structures 52 of signal path structures 48. Metal members 50 may be coupled to traces 40 on substrate 32 using solder, anisotropic conductive film or other conductive adhesive, welds, connectors such as connector 30, or other conductive structures.

The use of signal path structures 48 in forming conductive paths between the capacitive touch sensor electrodes of touch sensor 22 and traces 40 in printed circuit substrate 32 may help reduce the size of device 10 (e.g., by minimizing the size of the conductive paths to a size that is less than the size that would be consumed when using cables or other potentially bulky structures). As an example, conductive signal path structures 48 may be used in forming a conductive signal path with numerous parallel signal conductors that make a sharp right-angle bend between display 14 and the rest of device 10. This sharp right-angle bend may consume less space than would be involved in accommodating a relatively large bend radius in a flexible printed circuit cable. In addition, some or all of width W of the upper surface of structures 48 may be covered with anisotropic conductive film 42. This may maximize the mechanical support properties of the adhesive joint formed from anisotropic conductive film 42. The joint formed from film 42 may, for example, be sufficiently robust to serve as the exclusive adhesive attachment between support structure 52 and display 14, even though anisotropic conductive film sometimes does not exhibit the same amount of shock resistance as other adhesives.

Figure 7:
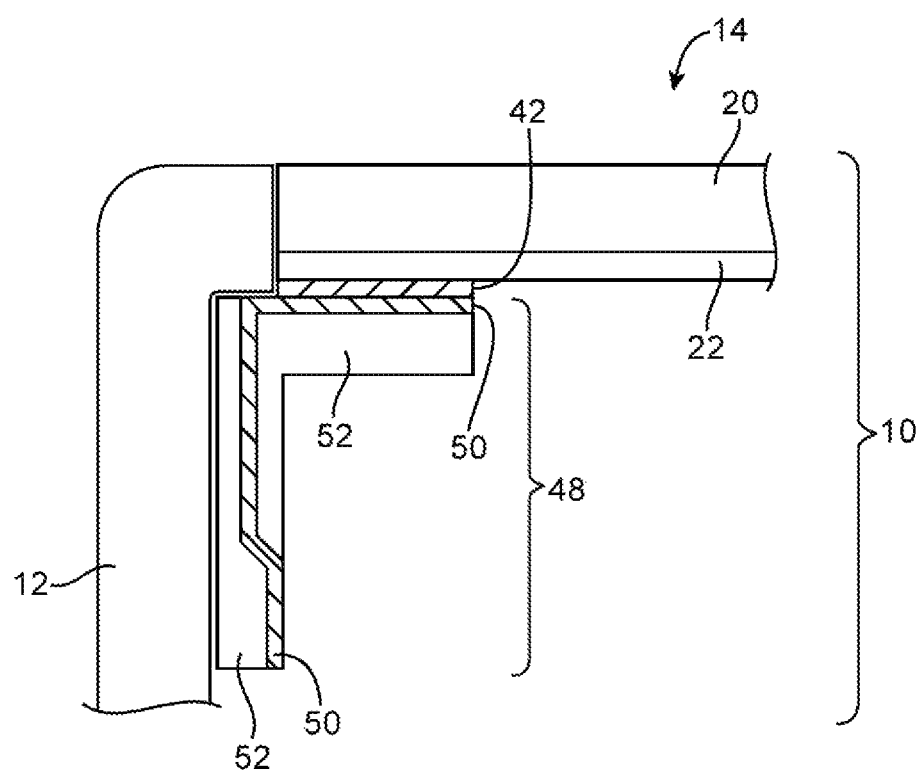
FIG. 7 is a cross-sectional side view of a portion of an electronic device in which a signal path structure has been formed using metal members embedded within a dielectric carrier such as an injection molded plastic member in accordance with an embodiment.

As shown in FIG. 7, conductive signal path structures 48 may be formed by embedding elongated metal members 50 such as metal pins or other conductive structures within dielectric support structures 52. Members 50 may be formed within dielectric support structures 52 by press fitting members 50 into a plastic carrier, by insert molding (e.g., by injection molding plastic 52 around members 50 in an injection molding tool), by attaching metal members 50 to a dielectric support structures 52 with adhesive, or by using other techniques for incorporating metal paths such as elongated metal structures 50 into structures 48.

Structures 52 may be formed from plastic (e.g., rigid plastic) or other dielectric material. As shown in the cross-sectional side view of FIG. 7, portions of members 50 may be embedded within structures 52 and portions of members 50 may protrude from within structures 52 (e.g., so that these portions of members 50 lie on the surface of structures 52).

Figure 8:
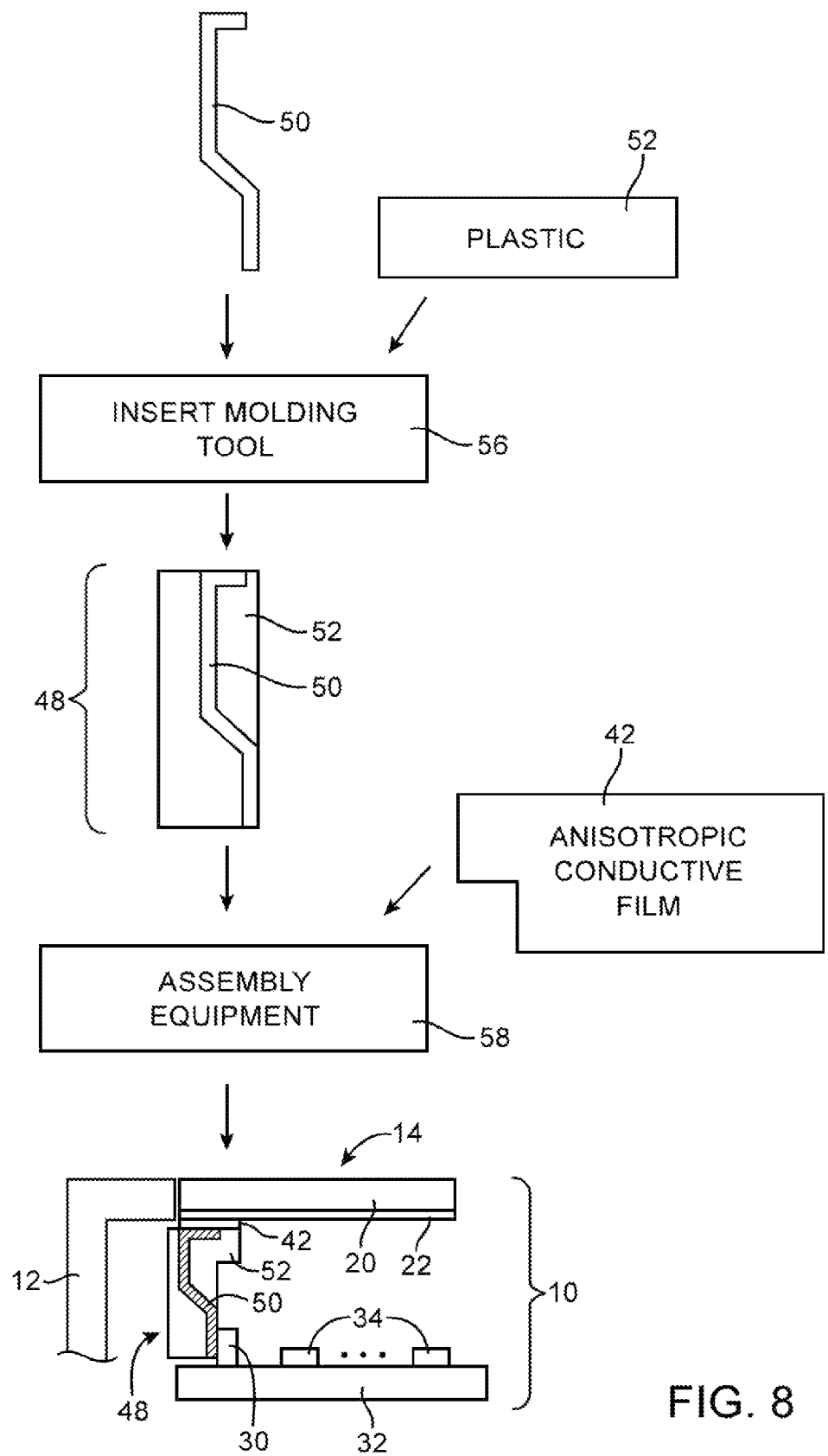
FIG. 8 is a diagram showing how signal path structures having metal members and a dielectric carrier of the type shown in FIG. 7 may be formed in accordance with an embodiment.

FIG. 8 is a diagram showing how signal path structures 48 of the type shown in FIG. 7 may be formed. Initially, metal structures 50 may be formed (e.g., by die cutting, by stamping a desired pattern into a metal foil, by machining, by casting members 50 from molten metal, or by otherwise forming elongated metal structures 50). Plastic 52 and members 50 may be placed within a die cavity in insert molding tool 56. Under heat and pressure, plastic 52 may be injection molded around some or all of members 50, thereby forming signal path structures 48 in which members 50 are generally at least partly embedded within plastic 52 (e.g., rigid plastic). Using assembly equipment 58 (e.g., computer-controlled positioners, a heated bar for forming an anisotropic conductive film connection with anisotropic conductive film 42, etc.), anisotropic conductive film 42 may be used to form an electrical connection between the capacitive touch sensor traces in touch sensor 22 and respective elongated metal structures (e.g., pins) 50 in conductive signal path structures 48. As shown in FIG. 8, connector 30 or other conductive structures may be used in electrically coupling metal structures 50 to signal paths in printed circuit 32. Structures 48 may have a horizontal portion (i.e., a portion in which plastic 52 extends parallel to display cover layer 20) and a vertical portion (i.e., a portion in which plastic 52 extends vertically downwards at a right angle to the horizontal portion and perpendicular to the plane of display cover layer 20).

Figure 9:
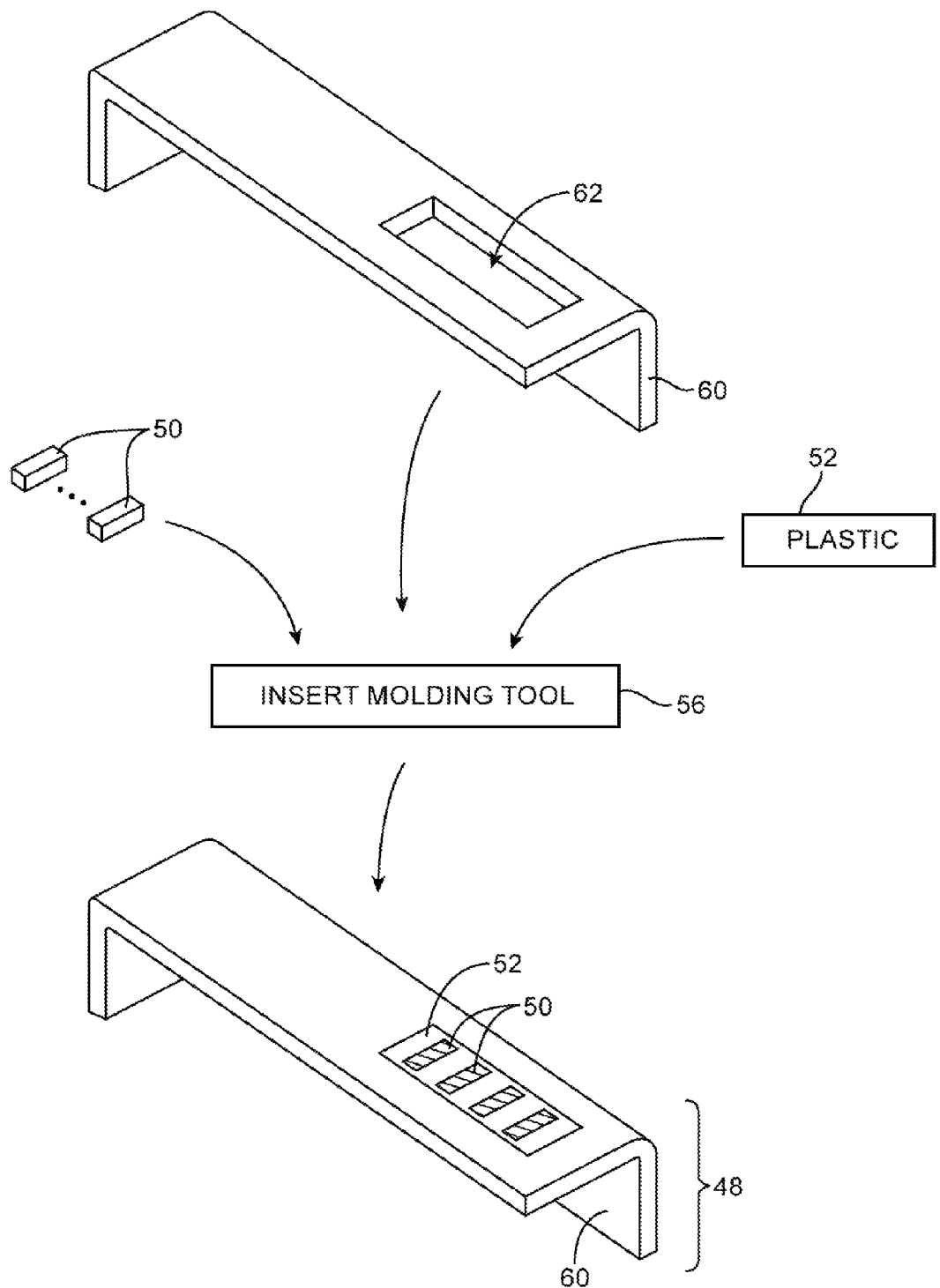
FIG. 9 is a perspective view of operations and equipment involved in forming an illustrative metal member having an opening filled with dielectric and embedded metal bars that form signal paths in an electronic device in accordance with an embodiment.

As shown in FIG. 9, a metal bracket or other metal member such as metal housing frame member 60 or other metal structure may be provided with an opening such as opening 62. Insert molding tool 56 (e.g., plastic injection molding equipment) may be used to injection mold plastic 52 and metal structures 50 (e.g., metal bars) into opening 62 of metal member 60, thereby forming conductive signal path structures 48 in which metal bars 50 extend through injection molded plastic 52 in opening 62.

Figure 10:
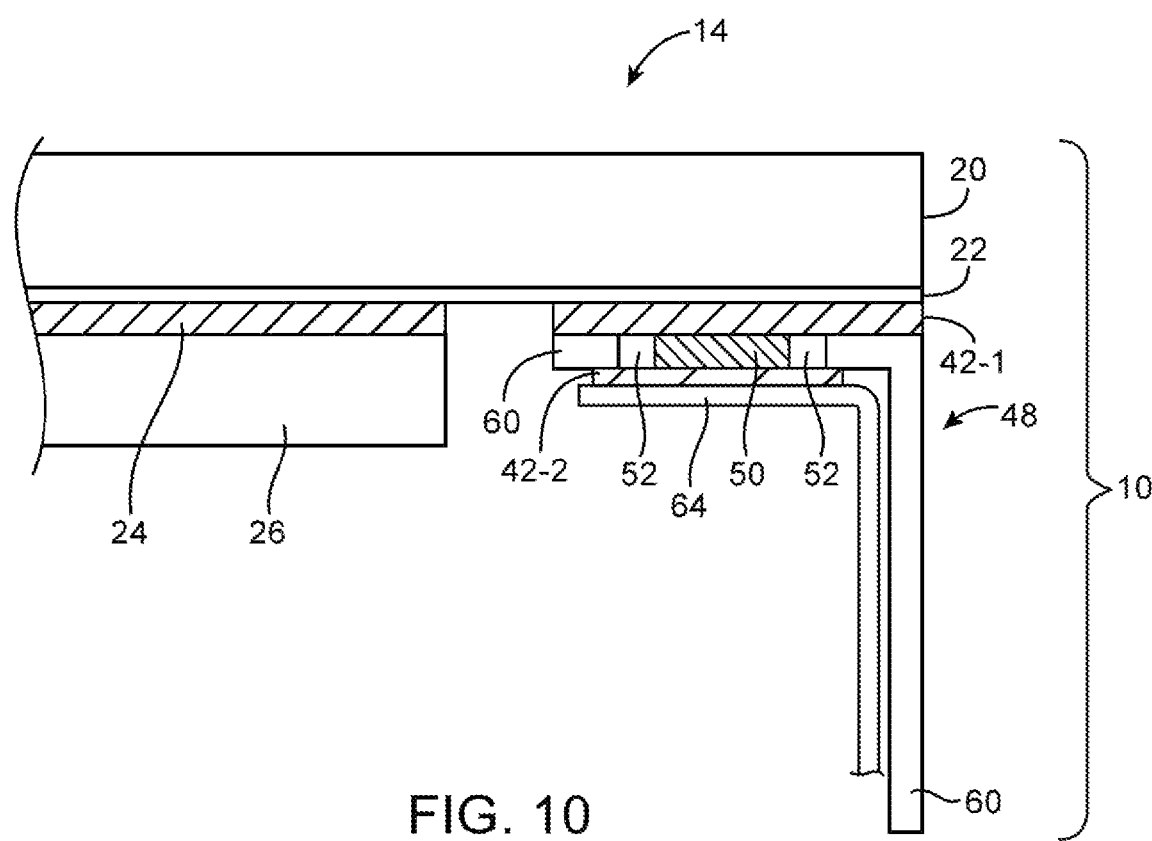
FIG. 10 is a cross-sectional side view of a display having a metal member of the type shown in FIG. 9 with that is used in forming a signal path coupled to a flexible printed circuit in accordance with an embodiment.

FIG. 10 is a cross-sectional side view of conductive signal path structures such as structures 48 of FIG. 10 in a portion of electronic device 10. As shown in FIG. 10, display 14 may have a cover layer such as display cover layer 20. Touch sensor 22 (e.g., a patterned array of conductive capacitive touch sensor electrodes such as indium tin oxide electrodes) may be formed on the underside of display cover layer 20. Adhesive 24 may be used to attach display module 26 to display cover layer 20 in the center of display 14. In a peripheral inactive border region of display 14, conductive adhesive layers may be used to form conductive signal paths between the traces in touch sensor 22 and traces in flexible printed circuit 64. For example, upper anisotropic conductive film layer 42-1 may be used in forming conductive paths between the traces of touch sensor 22 and respective metal bars 50 in structures 48. Lower anisotropic conductive film layer 42-2 may be used in forming conductive paths between metal bars 50 and respective metal traces in flexible printed circuit 64. Anisotropic film forms conductive paths upon application of sufficient heat and pressure.

To form multiple conductive paths in parallel, metal structures such as bars 50 may be formed with a thickness that is larger than the thickness of plastic 52. During compression of films 42-1 and 42-2 (e.g., using a heated bar), conductive paths will form in films 42-1 and 42-2 wherever the films overlap bars 50 due to the additional thickness of bars 50 and the resulting additional pressure applied to the films by bars 50. The portions of the anisotropic conductive film in less compressed regions will remain insulating so that all of the conductive paths in the anisotropic conductive film are not shorted together.

Metal structure 60 may be formed from a metal such as stainless steel (as an example) that allows the size (e.g., the thickness) of metal structure 60 to be minimized while providing structural strength for device 10. Metal structure 60 may, for example, form an internal frame member (e.g., an internal housing member) for device 10. If desired, other metals may be used (e.g., aluminum, etc.). The use of a metal such as stainless steel in forming metal member 60 in signal path structures 48 of FIG. 10 is merely illustrative.

Figure 11:
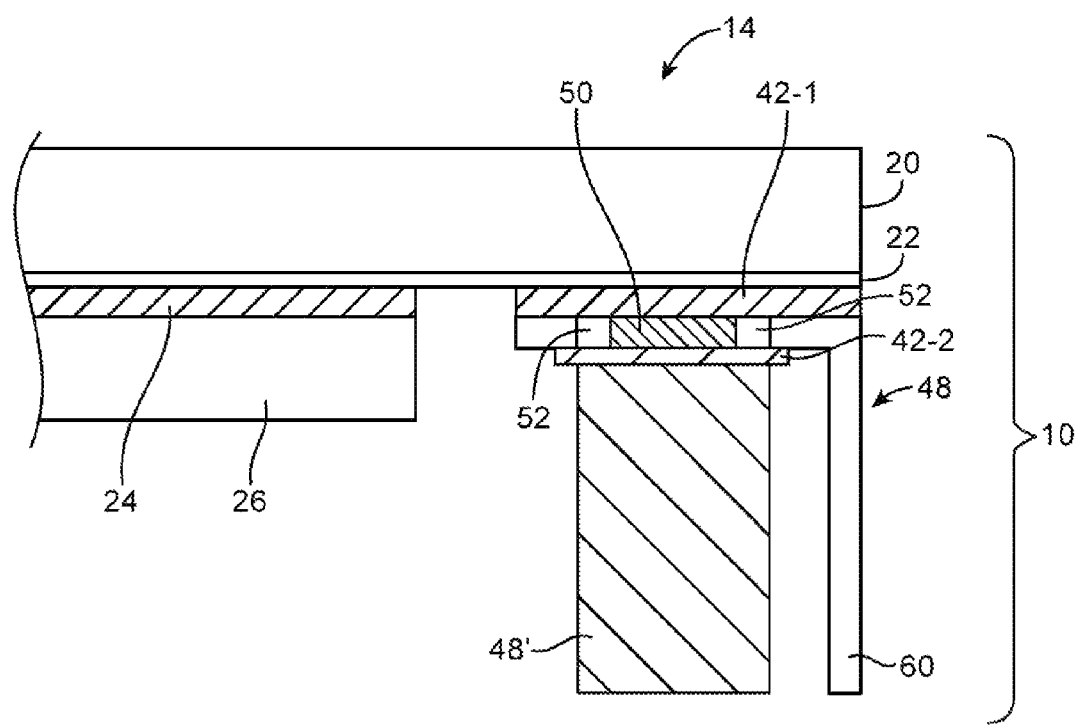
FIG. 11 is a cross-sectional side view of a display having a metal structure of the type shown in FIG. 9 that is used in forming a signal path coupled to metal members such as metal bars embedded within a dielectric carrier such as an injection molded plastic member of the type shown in FIG. 7 in accordance with an embodiment.

FIG. 11 is a cross-sectional side view of a portion of device 10 showing how a conductive path structure such as structure 48 of FIG. 4 (shown as structure 48' in FIG. 11) may be used in device 10. As shown in FIG. 11, structures 48 may include metal bars 50 in injection molded plastic 52 formed within an opening in metal member 60. Structures 48' may be formed from dielectric such as a block of injection molded plastic that includes embedded metal members (e.g., dielectric 52 and metal bars 50 of FIG. 4). The embedded metal members may have exposed surfaces at the top and bottom of the plastic block. The exposed surfaces of the embedded metal members may each form an electrical contact with a respective one of metal bars 50 of FIG. 11 using a respective compressed portion of interposed anisotropic conductive film 42-2.

In structures such as the structures of FIGS. 10 and 11, the entire width of anisotropic conductive film 42-1 that is attached to the inner surface of display cover layer 20 helps form a mechanically sound bond between metal structure 60 and the other portions of structures 48 and display cover layer 20. Because this entire width is available for forming the anisotropic conductive film bond, it may be possible to achieve a desired bond quality using anisotropic conductive film material, even though other adhesives may exhibit superior properties such as superior shock resistance per unit area.

Figure 12:
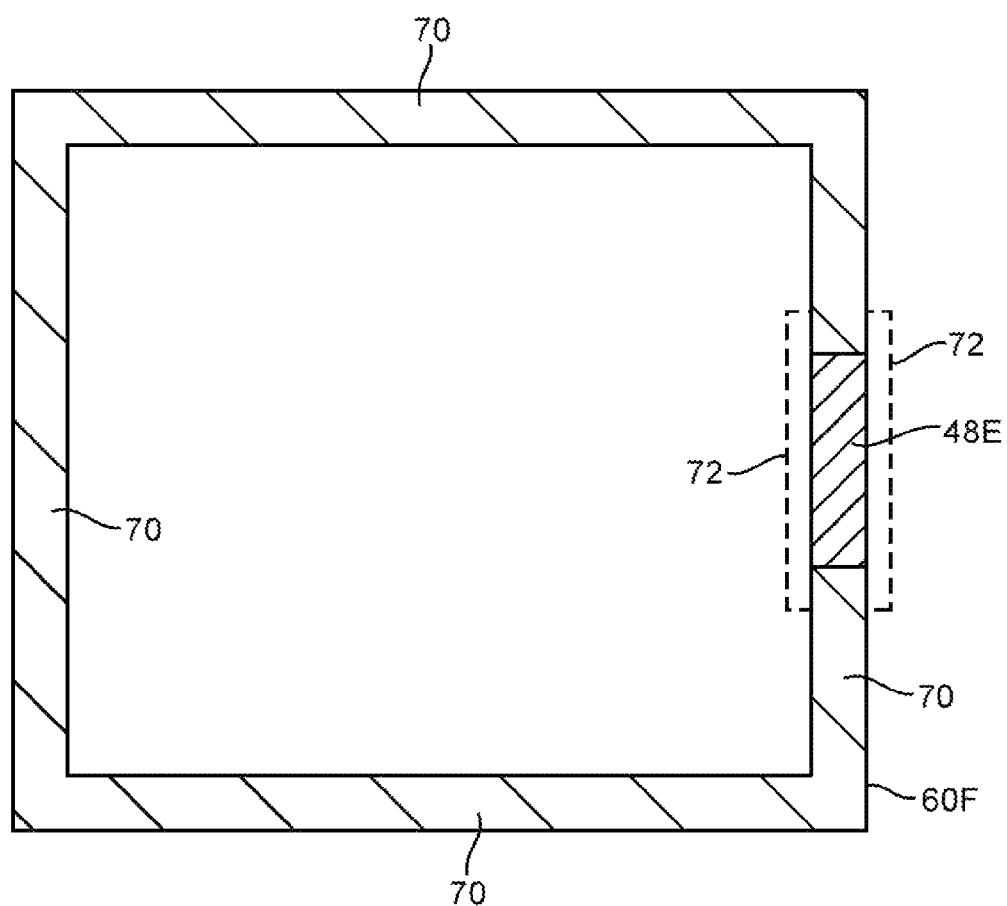
FIG. 12 is a top view of a housing structure having different regions covered with different types of adhesive in accordance with an embodiment.

If desired, the mechanical quality of the adhesive connections that are formed in device 10 can be enhanced while retaining desired conductive paths through anisotropic conductive film areas by using a combination of adhesive that has been formulated for its mechanical properties (sometimes referred to as mechanical adhesive) and anisotropic conductive film. As shown in the illustrative top view of device 10 in FIG. 12, for example, one edge segment of internal frame structure 60F of device 10 such as portion 48E may be covered with a layer of anisotropic conductive film to provide desired electrical connections between touch sensor traces and metal structures such as bars 50, whereas other portions of structure 60F such as portions 70 may be coated with mechanical adhesive (e.g., epoxy without metal particles, adhesive with elastomeric polymer components such as rubber particles for providing impact resistance qualities, etc.). As indicated by dashed line 72, portions 70 may, if desired be extended to encircle some or all of area 48E (e.g., so that mechanical adhesive can partly or completely surround anisotropic conductive film areas such as area 48E to provide area 48E with additional desired mechanical adhesive properties such as enhanced impact resistance).

Figure 13:
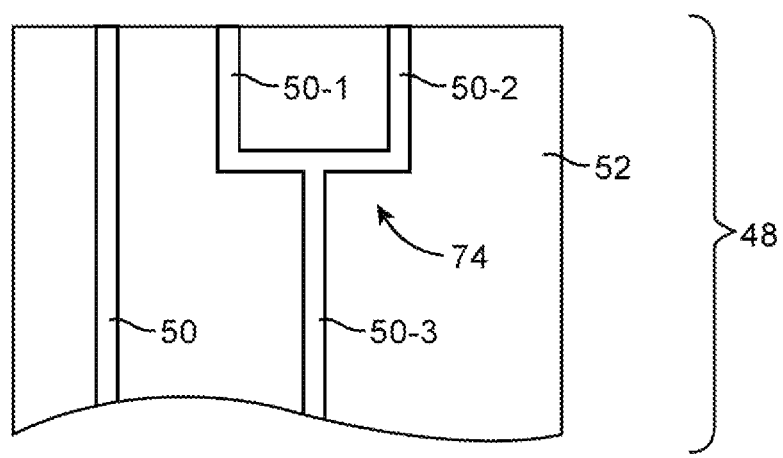
FIG. 13 is a side view of illustrative signal path structures having a dielectric carrier supporting metal members with branching shapes for forming merging signal paths in accordance with an embodiment.

FIG. 13 is a side view of structures 48 in a configuration in which multiple metal paths such as paths 50-1 and 50-2 merge at Y-junction 50Y to form unified path 50-3. With this type of branching signal path arrangement, multiple metal paths (e.g., two or more branch signal paths such as paths 50-1 and 50-2) may be joined to combine signals together (e.g., to short multiple signal lines to a common ground path or to a common signal line) or a single path may be split into multiple signal lines (e.g., to fan out signals among a group of signal lines). The metal paths of FIG. 13 (e.g., paths 50-1, 50-2, 50-3, and other paths 50) may be formed from metal pins or other metal members, from metal traces formed on the surface of dielectric 52, from metal structures that are embedded within dielectric 52, from metal structures in open channels within dielectric 52, from metal foil or a stamped sheet of metal that is attached to the surface of dielectric 52, or other metal structures.

Figure 14:
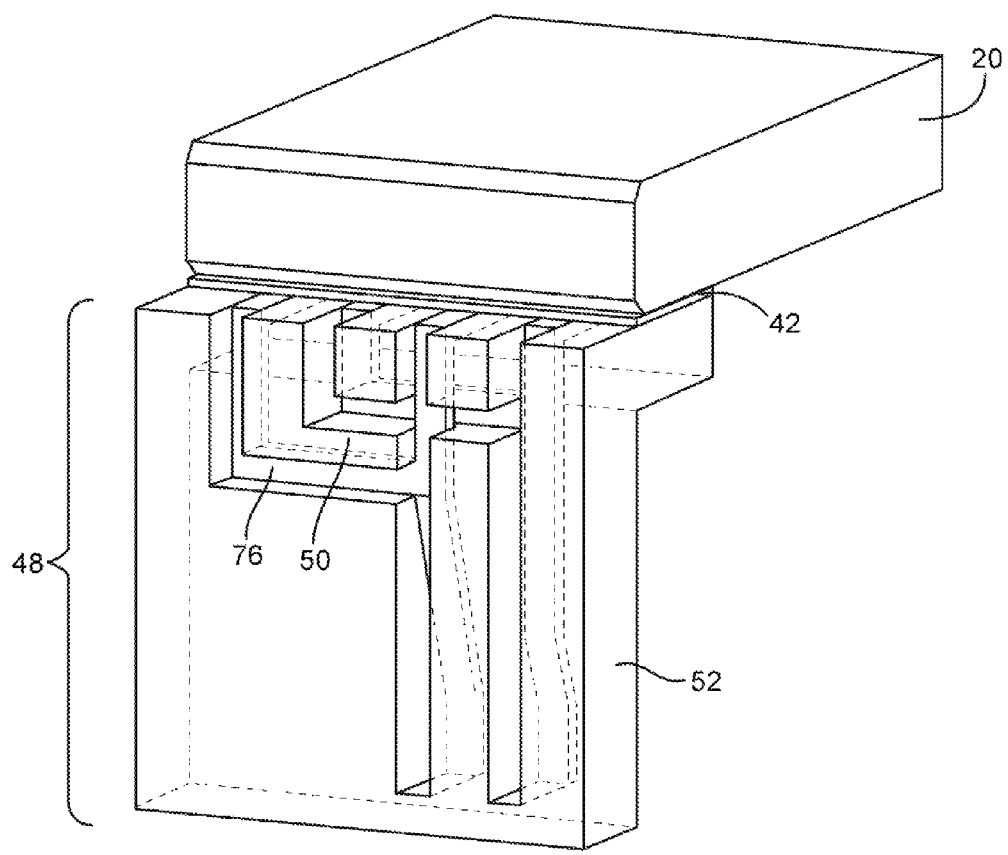
FIG. 14 is a perspective view of an illustrative dielectric carrier with channels or other regions that accommodate metal signal path structures such as metal pins in accordance with an embodiment.

FIG. 14 is an illustrative configuration in which metal structures 50 have been formed within open-topped channels 76 in dielectric 52. Dielectric 52 may, if desired, surround metal structures 50 (i.e., metal structures 50 can be enclosed within dielectric 52 using an insert molding process or other fabrication techniques). As with the other configurations for dielectric 52 of structures 48, plastic 52 (e.g., rigid injection molded plastic 52) of FIG. 14 has one portion that extends parallel to the plane of display cover layer 20 (i.e., the upper horizontal portion of structures 48) and another portion that extends perpendicular to display cover layer 20 (i.e., the vertical portion of structures 48). This type of configuration may be used to route signals vertically downwards towards a printed circuit board without consuming excess space by using a curved surface following a large bend radius.

Figure 15:
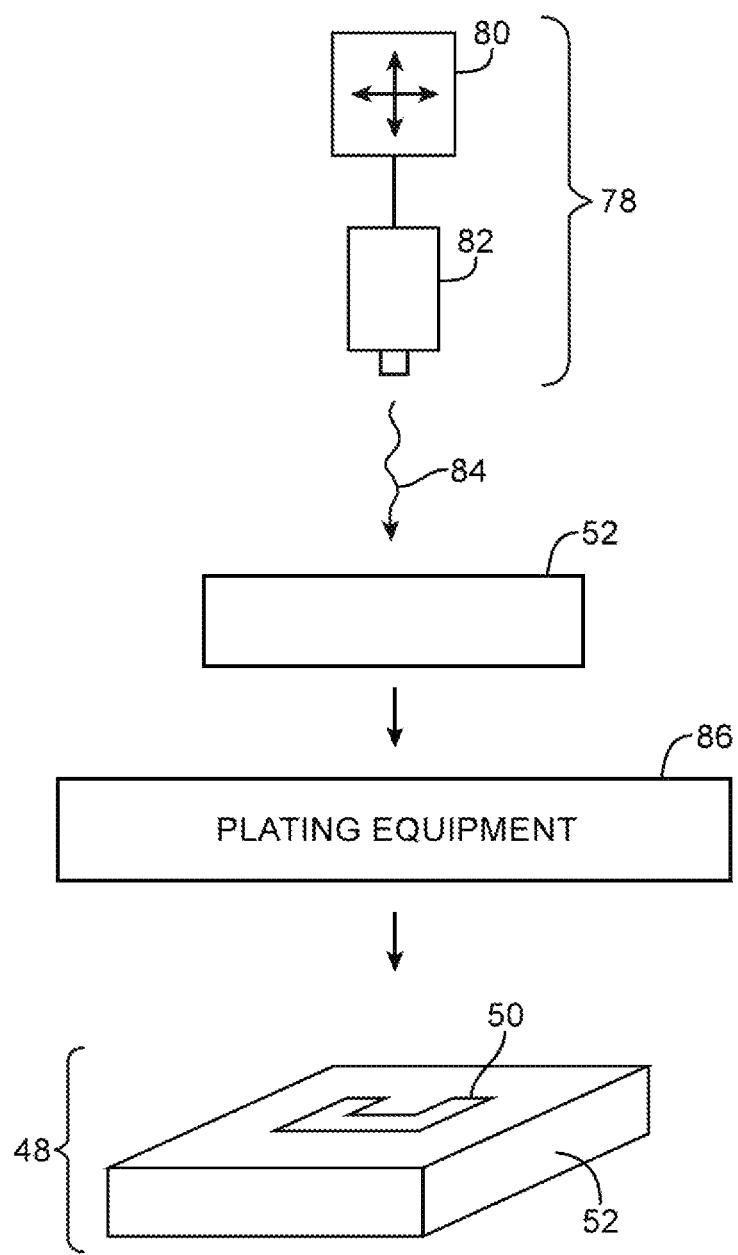
FIG. 15 is a diagram showing how laser-based processing techniques may be used for activating selected portions of the surface of plastic carrier and depositing metal on the activated portions of the carrier to form desired patterned metal structures in accordance with an embodiment.

FIG. 15 is a diagram of illustrative laser-based equipment and laser-based processing operations that may be used to form laser-deposited metal traces such as metal structures 50 for conductive signal path structures 48. As shown in FIG. 15, laser-based processing equipment 78 may include a computer-controlled positioner such as computer-controlled positioner 80 for controlling the position of laser 82. Laser 82 emits laser beam 84. Computer-controlled positioner 80 controls the position of laser beam 84 on the surface of dielectric 52 (e.g., rigid plastic such as plastic with metal particles or other material that can be selectively laser-activated by application of laser light).

Using computer-controlled positioner 80, equipment 78 may apply laser light 84 in a desired pattern on the surface of dielectric 52. The portions of dielectric 52 that are not exposed to light 84 will not be activated and will resist metal deposition during subsequent plating operations. The portions of dielectric 52 that are selectively activated by application of light 84 will promote metal formation during subsequent plating operations.

Following immersion in a metal plating bath or other plating process associated with plating equipment 86, metal lines 50 may be grown in a pattern defined by the laser-activated regions on dielectric 52 to form structures 48. Any suitable number of surfaces of dielectric 52 may be provided with metal traces 50 in this way. For example, edge portions of structures 48 may be plated by rotating dielectric 52 under laser beam 84.

Figure 16:
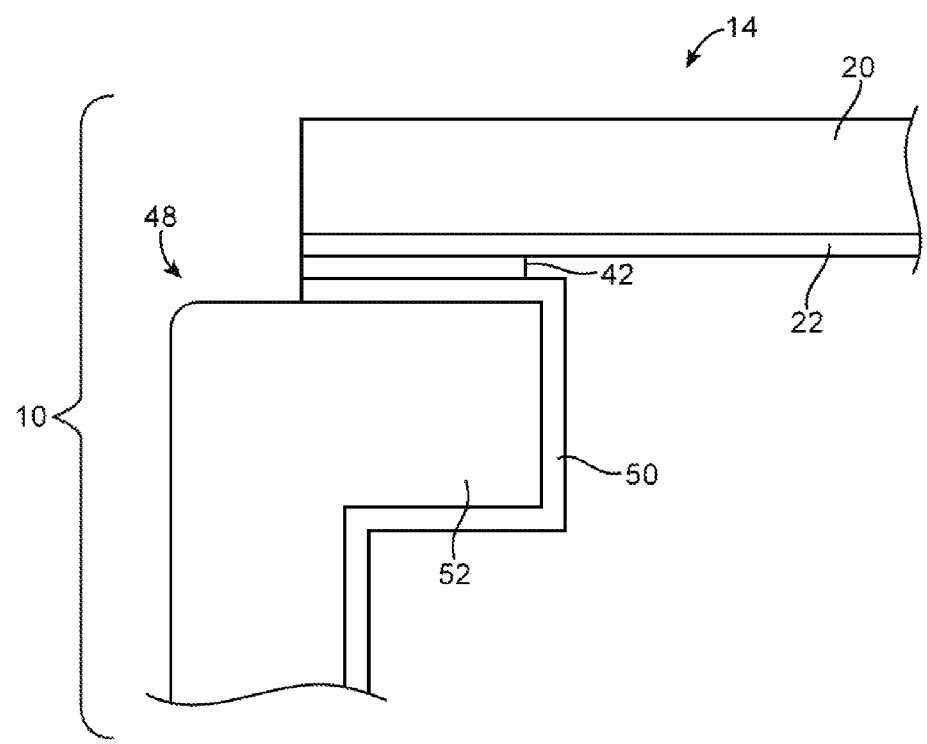
FIG. 16 is a cross-sectional side view of a portion of an electronic device in which a signal path has been formed using a plastic carrier with laser-patterned metal traces in accordance with an embodiment.

A cross-sectional side view of a portion of device 10 in the vicinity of structures 48 that have been formed using laser processing equipment of the type shown in FIG. 15 is shown in FIG. 16. As shown in FIG. 16, structures 48 may have a dielectric support such as dielectric 52 (e.g., rigid injection-molded plastic). Metal traces 50 may be formed using laser processing equipment of the type described in connection with FIG. 15. Traces 50 may include individual signal paths and branching (merging) signal paths of the type described in connection with FIG. 13. Anisotropic conductive film 42 may be used to form electrical connections between each of multiple traces 50 on dielectric 52 and respective capacitive touch sensor electrodes in touch sensor layer 22 on the lower surface of display cover layer 20.

Figure 17:
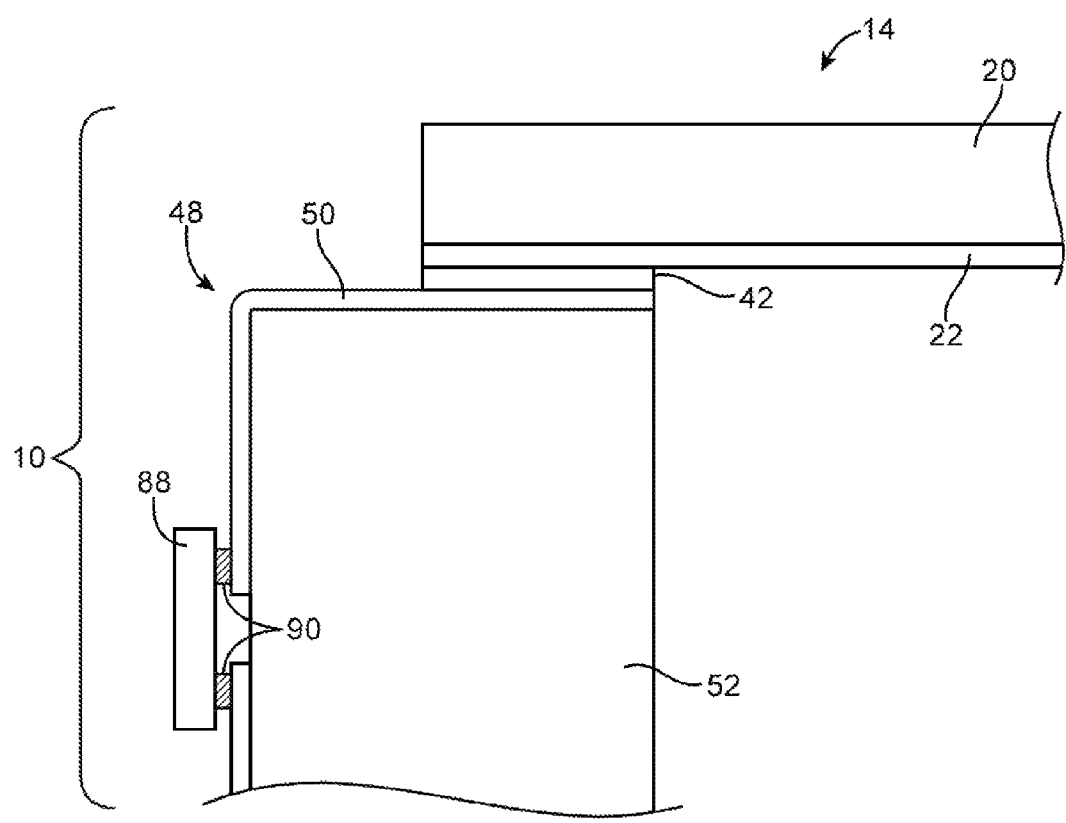
FIG. 17 is a cross-sectional side view of a portion of an electronic device in which a signal path has been formed using a plastic carrier with laser-patterned metal traces and in which an electronic component has been incorporated in accordance with an embodiment.

FIG. 17 is a cross-sectional side view of a portion of device 10 in a configuration in which an electrical component such as component 88 has been mounted to traces 50. As with the illustrative configuration of FIG. 16, structures 48 of FIG. 17 may have a dielectric support such as dielectric 52 (e.g., rigid injection molded plastic). Metal traces 50 on dielectric 52 may be laser-deposited traces formed using laser processing equipment of the type described in connection with FIG. 15. Traces 50 may include individual signal paths and branching (merging) signal paths. Anisotropic conductive film 42 may be used to form electrical connections between each of multiple traces 50 on dielectric 52 and respective capacitive touch sensor electrodes in touch sensor layer 22 on the lower surface of display cover layer 20. Connection structures 90 may be used in attaching one or more components such as component 88 to metal traces 50. Connection structures 90 may be based on welds, solder joints, conductive adhesive, or other conductive materials. For example, component 88 may be an integrated circuit that is soldered to metal structures 50.

Figure 18:
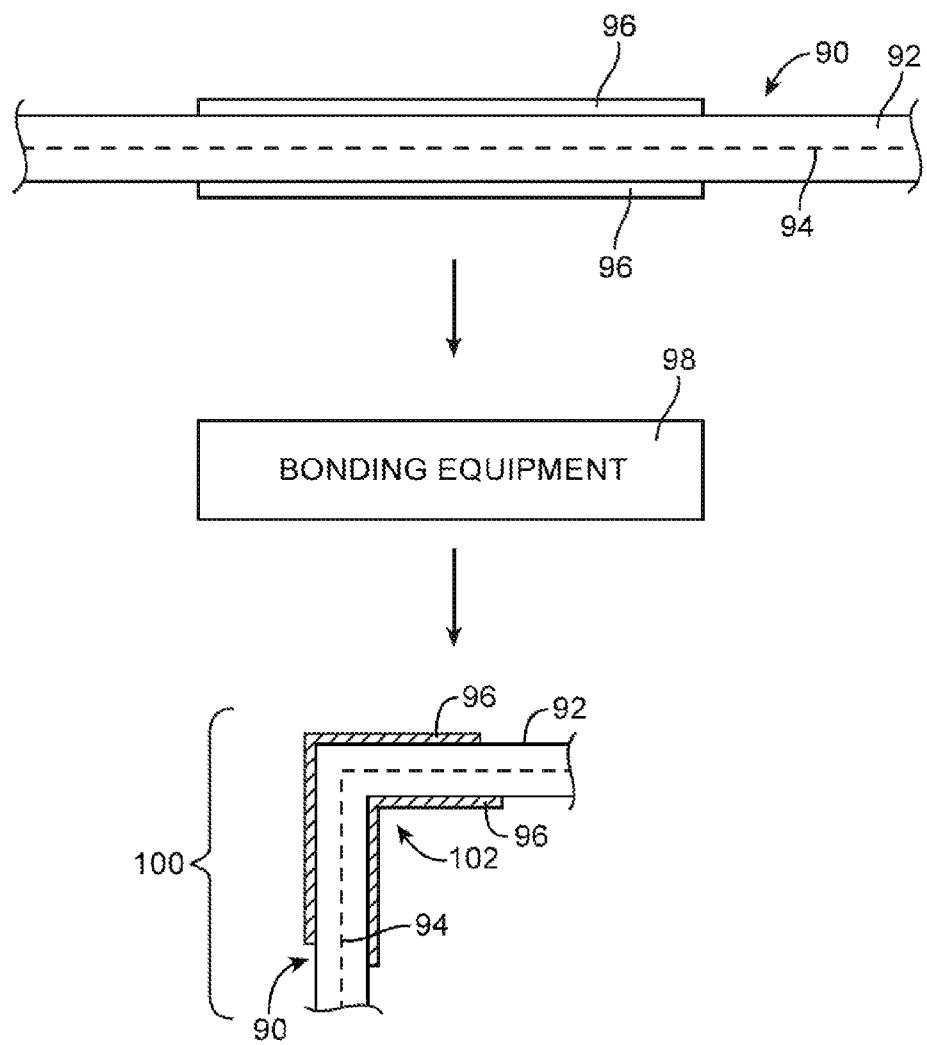
FIG. 18 is a cross-sectional side view of a system being used to form signal path structures based on a flexible printed circuit structure supported by upper and lower bent metal layers in an electronic device in accordance with an embodiment.

FIG. 18 shows how a flexible printed circuit may be supported using metal sheets. Flexible printed circuit 90 may contain a dielectric substrate such as substrate 92 (e.g., a layer of polyimide or other flexible polymer sheet). One or more layers of patterned metal traces 94 may be formed within substrate 92. Adhesive or other attachment mechanisms may be used to attach metal sheets 96 to one or both of the opposing upper and lower surfaces of flexible printed circuit 90. Bending equipment 98 may bend flexible printed circuit 90 and metal support sheets 96 to form signal path structures 100 with a bend such as bend 102. Bend 102 may be a right angle bend of the type shown in FIG. 18 or may be characterized by an angle that is less than or greater than 90°. Due to the presence of metal sheets 96, flexible printed circuit 90 may retain bend 102 and structures 100 may be sufficiently robust to serve as mechanical support structures (e.g. part of an internal housing frame, etc.) in device 10.

Figure 19:
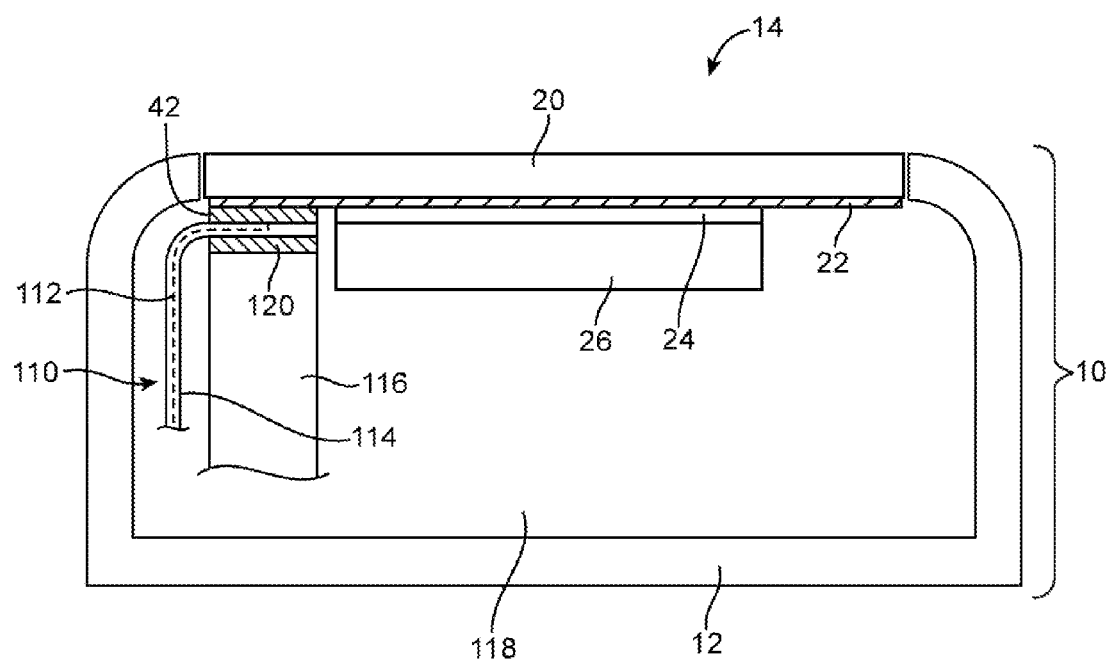
FIG. 19 is a cross-sectional side view of an electronic device in which an anisotropic conductive film bond and an adhesive layer are used in forming a layered structure including a flexible printed circuit layer in accordance with an embodiment.

FIG. 19 is a cross-sectional side view of device 10 in a configuration in which multiple layers of adhesive are being used to attach flexible printed circuit 110 within device 10. Display 14 of device 10 is mounted in housing 12. Display module 26 may be mounted to display cover layer in display 14 using adhesive layer 24. Flexible printed circuit 110 has one or more layers of patterned metal traces 112 supported by a polyimide layer or other flexible polymer substrate (substrate 114). Structure 116 (e.g., an internal frame structure or other structure) may be mounted within interior 118 of housing 12. Display 14 includes touch sensor 22 (e.g., capacitive touch sensor electrode traces such as patterned indium tin oxide traces on the lower surface of display cover layer 20).

Adhesive 42 may be interposed between the upper surface of flexible printed circuit 110 and the lower surface of display 14 (e.g., the lower surface of touch sensor 22 on the lower surface of display cover layer 20). Adhesive 42 may be a conductive adhesive such as anisotropic conductive film and may be used to make one or more electrical connections between flexible printed circuit 110 and touch sensor 22. For example, anisotropic conductive film 42 may be used to couple each of multiple traces 112 in flexible printed circuit 110 to respective conductive traces in touch sensor 22 (e.g., respective indium tin oxide capacitive electrode traces in touch sensor 22).

Adhesive 120 may be interposed between the lower surface of flexible printed circuit 110 and the upper surface of support structure 116 (e.g., an internal housing frame, a portion of an external housing member, or other structure in device 10). Adhesive 120 may be formed from anisotropic conductive film, mechanical adhesive, or a mixture of anisotropic conductive film and mechanical adhesive. As an example, adhesive 120 may be formed from an adhesive material that includes shock-resistant filler such as elastomeric particles (e.g., rubber beads such as nitrile beads). The presence of nitrile beads or other elastomeric additive to adhesive 120 may help enhance the impact resistance and toughness of adhesive 120, but may not be compatible with anisotropic conductive film formulations. Accordingly, the adhesive that is interposed between flexible printed circuit 110 and structures 116 (i.e., adhesive 120) may, if desired, be formed from adhesive that does not contain anisotropic conductive film particles (i.e., an adhesive that is free of anisotropic conductive film metal balls).

With a configuration of the type shown in FIG. 19, flexible printed circuit 110 is sandwiched between two adhesive layers. Layer 42 may be an anisotropic conductive film that forms conductive paths between traces 112 and corresponding traces in touch sensor 22. Layer 120 may be an adhesive that provides shock resistance to the stack-up formed by the adhesive layers. Because the portion of flexible printed circuit 110 that is sandwiched between structures 116 and display 14 is supported by both adhesive layer 120 and layer 42, layer 120 can enhance the mechanical strength and impact resistance of the adhesive connection between flexible printed circuit 110 and the other structures of device 10 (i.e., the mechanical adhesive properties of layer 120 can supplement the adhesive properties of layer 42, which allows layer 42 to be formed from a material such as anisotropic conductive film that may have lower impact resistance than mechanical adhesive).

Although the structures of FIG. 19 that are sandwiched between adhesive layers 42 and 120 in FIG. 19 are formed from flexible printed circuit 110, other structures (e.g., other substrate layers, other flexible layers, other polymer layers, or other sheets of material or structures) may be sandwiched between adhesive layers such as layers 42 and 120, if desired. The configuration of FIG. 19 is merely illustrative.

Figure 20:
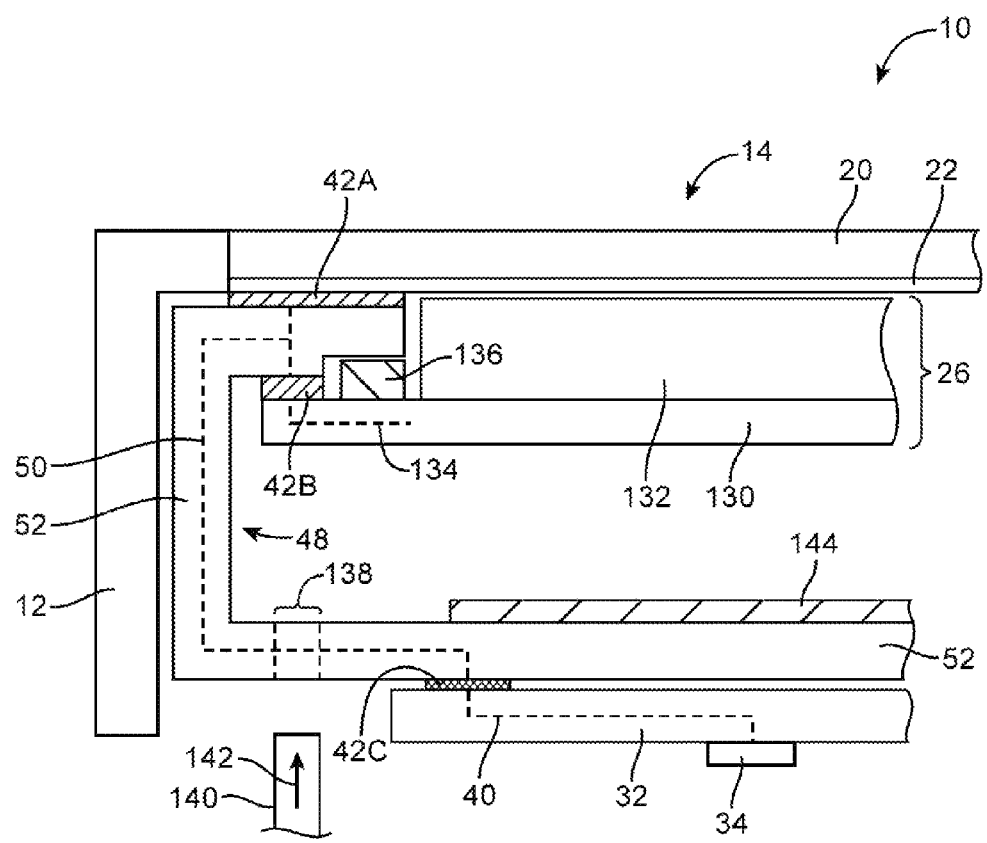
FIG. 20 is a cross-sectional side view of a portion of an electronic device having a plastic display chassis structure that includes a signal path coupled to a touch sensor and traces in a thin-film transistor layer in a display in accordance with an embodiment.

As shown in FIG. 20, device 10 may use conductive signal path structures 48 in connecting touch sensor structures 22 and/or display structures such as display structures in display module 26 to circuitry such as circuitry 34 on one or more substrates such as printed circuit 32. Touch sensor structures 22 may be formed on the lower surface of display cover layer 20. Conductive signal path structures 48 may be formed from dielectric 52 and conductive paths 50. Dielectric 52 may be plastic such as rigid injection molded plastic or other dielectric. Conductive paths 50 may be formed from metal pins, from traces formed on surface regions in structures 48, from patterned metal foil or a patterned metal sheet that is attached to a surface portion of dielectric 52, or from other conductive structures. Anisotropic conductive film 42A may be used to form electrical connections between conductive traces in touch sensor structures 22 and corresponding conductive paths 50 in structures 48, so that signals can be routed between touch sensor structures 22 and circuitry 34 on printed circuit 32.

Display layers associated with display module 26 may also be electrically coupled to printed circuit board 32 using conductive signal path structures 48. Display module 26 may include layers such as layer 132 and layer 130. Layer 132 may be a color filter layer. Layer 130 may be a thin-film transistor layer having a glass or plastic substrate that includes a layer of thin-film transistors (e.g., a thin-film transistor layer substrate layer in a liquid crystal display, etc.). Display driver integrated circuit 136 may be used in supplying signal lines 134 on thin-film transistor layer 130 with display data and control signals. Signal lines 134 (e.g., metal traces) may be used to route signals to and from thin-film circuitry and other components in layer 130. Anisotropic conductive film 42B may be used in coupling traces 134 to conductive signal paths 50 in structures 48. Anisotropic conductive film 42C may be used in coupling conductive paths 50 to traces 40 in printed circuit 32. Traces 40 are also coupled to integrated circuits and other components 34 on printed circuit 32.

Dielectric 52 may have an opening such as opening 138 to allow heated bar 140 to move in direction 142. This allows heated bar 140 to be used to apply heat and pressure to films 42A and 42B to form satisfactory electrical and mechanical anisotropic conductive adhesive bonds. Components such as component 144 may be supported within the interior of device 10 using dielectric 52. For example, dielectric 52 may have the shape of a rectangular ring-shaped plastic display chassis (sometimes referred to as a p-chassis). The p-chassis formed from plastic 52 may be used to support display layers such as backlight unit layers in a display backlight unit. Component 144 may, for example, include one or more display backlight components such as a light guide plate, a rear reflective layer, diffuser films, compensating films, prism films, and other layers associated with a backlight for display 14. In this way, structures 48 may serve both as a support for conductive paths 50 and as a support for display structures such as component 144 (e.g., a backlight unit or other display layers).

The foregoing is merely illustrative and various modifications can be made by those skilled in the art without departing from the scope and spirit of the described embodiments. The foregoing embodiments may be implemented individually or in any combination.

What is claimed is:

1. An apparatus, comprising:
   signal path structures having metal structures that convey signals and a rigid plastic member that supports the metal structures;
   a display layer having metal traces coupled to the metal structures with anisotropic conductive film;
   a printed circuit;
   conductive traces in the printed circuit that are coupled to the metal structures with anisotropic conductive film; and
   a light guide plate that is mounted on and supported by the rigid plastic member.

2. The apparatus defined in claim 1 wherein the rigid plastic member comprises a plastic display chassis.

3. The apparatus defined in claim 2, wherein the plastic display chassis is a rectangular ring-shaped plastic display chassis.

4. The apparatus defined in claim 3, wherein the rectangular ring-shaped plastic display chassis has a first portion that extends parallel to the light guide plate, a second portion that extends parallel to the light guide plate, and a third portion that is perpendicular to the first and second portions.

5. The apparatus defined in claim 2, further comprising a reflective layer that is mounted on and supported by the rigid plastic member.

6. The apparatus defined in claim 1 wherein the display layer comprises a thin-film transistor substrate layer.

7. The apparatus defined in claim 6 further comprising a touch sensor having capacitive touch sensor electrodes coupled to at least some of the metal structures in the signal path structures with anisotropic conductive film.

8. The apparatus defined in claim 7 further comprising:
   components mounted on the printed circuit.

9. The apparatus defined in claim 1 wherein the rigid plastic member comprises injection molded plastic and wherein the metal structures comprise metal pins that are at least partly embedded within the injection molded plastic, the apparatus further comprising a touch sensor coupled to the metal pins.

10. An apparatus, comprising:
    a display cover layer;
    touch sensor electrodes on the display cover layer;
    signal path structures including a rigid plastic member and metal structures supported by the rigid plastic member;
    a layer of anisotropic conductive film that electrically couples the metal structures to the touch sensor electrodes and that attaches the rigid plastic member to the display cover layer; and
    a metal member with first and second opposing surfaces and an opening that extends from the first surface to the second surface, wherein the rigid plastic member comprises injection molded plastic that fills the opening, wherein the injection molded plastic that fills the opening has first and second opposing surfaces, and wherein the metal structures comprise metal bars that extend through the injection molded plastic from the first surface of the injection molded plastic to the second surface of the injection molded plastic.

11. The apparatus defined in claim 10 further comprising a plastic block with metal members, wherein the plastic block with metal members are formed separately from the signal path structures, wherein each metal member of the plastic block is electrically coupled to a respective one of the metal bars through an additional layer of anisotropic conductive film.

12. An apparatus, comprising:
    a plastic display chassis;
    a display backlight that includes a light guide plate, wherein the light guide plate is mounted on the plastic display chassis, and wherein the plastic display chassis comprises metal structures that convey signals and a rigid plastic member that supports the metal structures;
    a display layer having metal traces coupled to the metal structures with anisotropic conductive film;
    a printed circuit; and
    conductive traces in the printed circuit that are coupled to the metal structures with anisotropic conductive film.

13. The apparatus defined in claim 12, wherein the plastic display chassis comprises a first portion that extends parallel to the light guide plate, a second portion that extends parallel to the light guide plate, and a third portion that is perpendicular to the first and second portions.

14. The apparatus defined in claim 13, wherein the display layer having metal traces is coupled to the second portion of the plastic display chassis.

15. The apparatus defined in claim 14, wherein the conductive traces in the printed circuit are coupled to the first portion of the plastic display chassis, and wherein the light guide plate is mounted on the first portion of the plastic display chassis.

16. The apparatus defined in claim 15, wherein the third portion of the plastic display chassis connects the first portion to the second portion.

17. The apparatus defined in claim 12, wherein the metal structures comprise metal pins, and wherein the rigid plastic member comprises injection molded plastic that surrounds at least some of the metal pins.

18. The apparatus defined in claim 12, wherein the metal structures comprise metal traces on at least one surface of the rigid plastic member.

19. The apparatus defined in claim 12 wherein the metal structures include at least one branching metal structure having multiple branches that merge into a single branch.

20. The apparatus defined in claim 12 wherein the rigid plastic member has channels that receive the metal structures.

21. The apparatus defined in claim 12 wherein the rigid plastic member comprises injection molded plastic and wherein the metal structures comprise laser-deposited metal traces on the injection molded plastic.

22. The apparatus defined in claim 12 further comprising an electrical component soldered directly to the metal structures.

\* \* \* \* \*